(12) United States Patent
Chopra et al.

(10) Patent No.: US 9,871,649 B2
(45) Date of Patent: Jan. 16, 2018

(54) REAL TIME SUBSAMPLE TIME RESOLUTION SIGNAL ALIGNMENT IN TIME DOMAIN

(71) Applicant: NATIONAL INSTRUMENTS CORPORATION, Austin, TX (US)

(72) Inventors: Aditya Chopra, Austin, TX (US); Sean P. Ferguson, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 15/194,800

(22) Filed: Jun. 28, 2016

(65) Prior Publication Data

US 2016/0380756 A1    Dec. 29, 2016

Related U.S. Application Data

(60) Provisional application No. 62/186,061, filed on Jun. 29, 2015.

(51) Int. Cl.
| | |
|---|---|
| *H04L 7/02* | (2006.01) |
| *H04L 7/00* | (2006.01) |
| *G06F 13/28* | (2006.01) |
| *G06F 9/44* | (2006.01) |

(52) U.S. Cl.
CPC ............ *H04L 7/02* (2013.01); *G06F 9/44* (2013.01); *G06F 13/28* (2013.01); *H04L 7/0029* (2013.01); *H04L 7/0033* (2013.01); *H04L 7/0041* (2013.01)

(58) Field of Classification Search
CPC ....... H04L 7/02; H04L 7/0033; H04L 7/0041; H04L 7/0029; G06F 8/34; G06F 9/44; G06F 13/28
See application file for complete search history.

(56) References Cited

U.S. PATENT DOCUMENTS

2013/0258312 A1\* 10/2013 Lewis ................... G01S 7/4865
356/4.01

OTHER PUBLICATIONS

Maskell, "Adaptive Subsample Delay Estimation Using Windowed Correlation," IEEE Transactions on Circuits and Systems, vol. 53, No. 6, IEEE, Jun. 2006.\*

(Continued)

*Primary Examiner* — Michelle M Koeth
(74) *Attorney, Agent, or Firm* — Meyertons Hood Kivlin Kowert & Goetzel, P.C.; Jeffrey C. Hood

(57) ABSTRACT

System and method for subsample time resolution signal alignment. First and second signals may be aligned by iteratively performing the following until a termination condition is met: current samples of the first and second signals may be acquired, a delayed copy of the current samples of the first signal may be generated and subtracted from the current samples of the first signal to generate a third signal, a delayed copy of the current samples of the second signal may be generated with a current subsample delay and subtracted from the current samples of the first signal to generate a fourth signal, and an alignment error may be generated based on the third and fourth signals and the current subsample may be delay adjusted accordingly. The iteratively adjusting may generate a subsample resolution delay aligning the second signal to the first signal. Subsequent samples the first signal and the second signal may be aligned and output per the subsample resolution delay.

19 Claims, 8 Drawing Sheets

(56) References Cited

OTHER PUBLICATIONS

Nentwig, "Signal Fitting with Subsample Resolution," DSP Related.com, Aug. 16, 2011 (available at https://www.dsprelated.com/showcode/207.php, last accessed Apr. 12, 2017).*

Hermanowicz, "Self-Tuning Sub-Sample Delay Estimator," 17th European Signal Processing Conference (EUSIPCO 2009), EURASIP, Aug. 28, 2009.*

* cited by examiner

US 9,871,649 B2

REAL TIME SUBSAMPLE TIME RESOLUTION SIGNAL ALIGNMENT IN TIME DOMAIN

PRIORITY INFORMATION

This application claims the benefit of U.S. Provisional Application No. 62/186,061, filed on Jun. 29, 2015, which is incorporated by reference herein in its entirety as though fully and completely set forth herein as though fully and completely set forth herein.

FIELD OF THE INVENTION

The present invention relates to the field of signal alignment, and more specifically, to real time subsample time resolution signal alignment in the time domain.

DESCRIPTION OF THE RELATED ART

Stimulus and response signals are used for model parameter estimation of black box systems, and time alignment is a critical aspect of model parameter estimation in one dimensional signals. In order to achieve accurate estimates, the stimulus and response signals must be aligned in time. However, time alignment generally requires high computational complexity to achieve high accuracy; prior art approaches use frequency domain processing and Fast Fourier Transforms (FFTs) to time align signals to high accuracy. Moreover, in the case of low bandwidth signals, these time alignment techniques cause information loss. Improvements in the field are desired.

SUMMARY OF THE INVENTION

Various embodiments are presented below of a system and method for real time subsample time resolution signal alignment in the time domain. In some embodiments, a system includes an input, a functional unit coupled to the input, and an output coupled to the functional unit. The functional unit may be configured to align first and second signals by iteratively performing the following method.

First, the system may acquire, via the input, a current set of samples of the first signal and the second signal. The system may then generate a delayed copy of the current set of samples of the first signal, and subtract the delayed copy of the current set of samples of the first signal from the current set of samples of the first signal, thereby generating a third signal. The system may also generate a delayed copy of the current set of samples of the second signal, wherein the delay has a current subsample resolution time duration, and subtract the delayed copy of the current set of samples of the second signal from the current set of samples of the first signal, thereby generating a fourth signal. An error in alignment of the first and second signals may be generated based on the third and fourth signals and the current subsample resolution time duration may be adjusted based on the error in alignment.

The functional unit may be configured to perform these steps one or more times in an iterative manner, wherein iteratively adjusting the current subsample resolution time duration generates a subsample resolution delay that aligns the second signal to the first signal. The functional unit may be further configured to output, via the output, subsequent sets of samples of the first signal and the second signal in accordance with the subsample resolution delay, wherein the subsequent sets of samples of the second signal are aligned with the subsequent sets of samples of the first signal.

BRIEF DESCRIPTION OF THE DRAWINGS

A better understanding of the present invention can be obtained when the following detailed description of the preferred embodiment is considered in conjunction with the following drawings, in which.

Figure 1A:
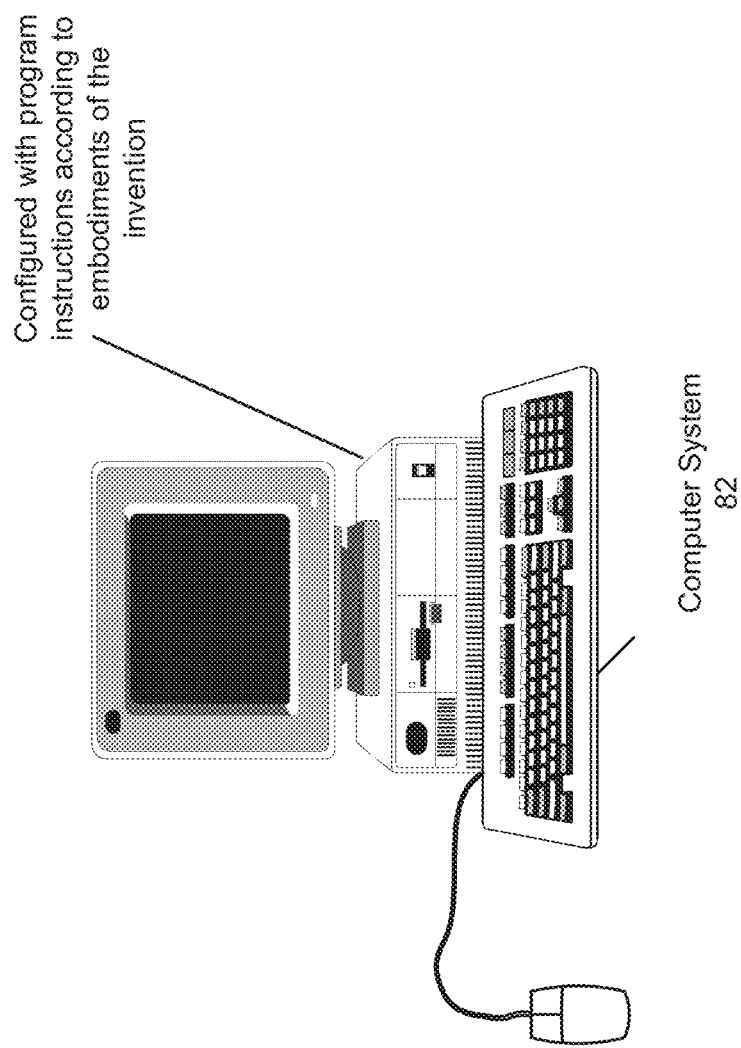
FIG. 1A illustrates a computer system configured to perform a signal alignment method according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

FIG. 1A—Computer System

FIG. 1A illustrates a computer system 82 configured to implement embodiments of the techniques disclosed herein. Embodiments of a method for real time subsample time resolution signal alignment in the time domain are described below. Note that various embodiments of the techniques disclosed herein may be implemented in a variety of different ways. For example, in some embodiments, some or all of the techniques may be implemented with textual or graphical programs that may be deployed to, or used to configure, any of various hardware devices.

Thus, while some embodiments are described in terms of one or more programs, e.g., graphical programs, executing on a computer, e.g., computer system 82, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As shown in FIG. 1A, the computer system 82 may include a display device configured to display a graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, such as graphical programs, that are executable to perform the methods described herein. The memory medium may also store operating system software, as well as other software for operation of the computer system. Various embodiments further include receiving or storing instructions and/or data implemented in accordance with the foregoing description upon a carrier medium.

Figure 1B:
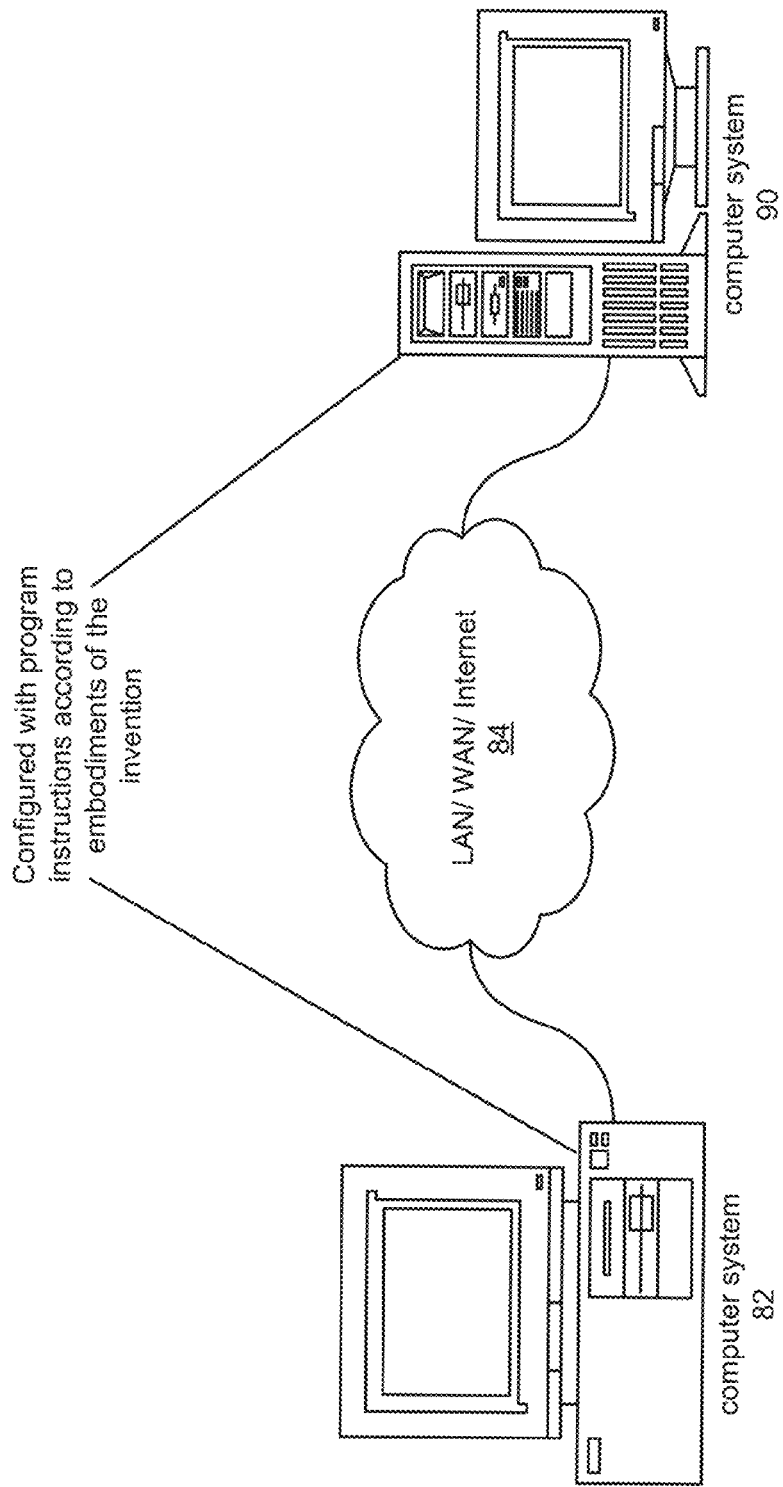
FIG. 1B illustrates a network system comprising two or more computer systems that may implement an embodiment of the present disclosure.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may align first and second signals as described herein.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
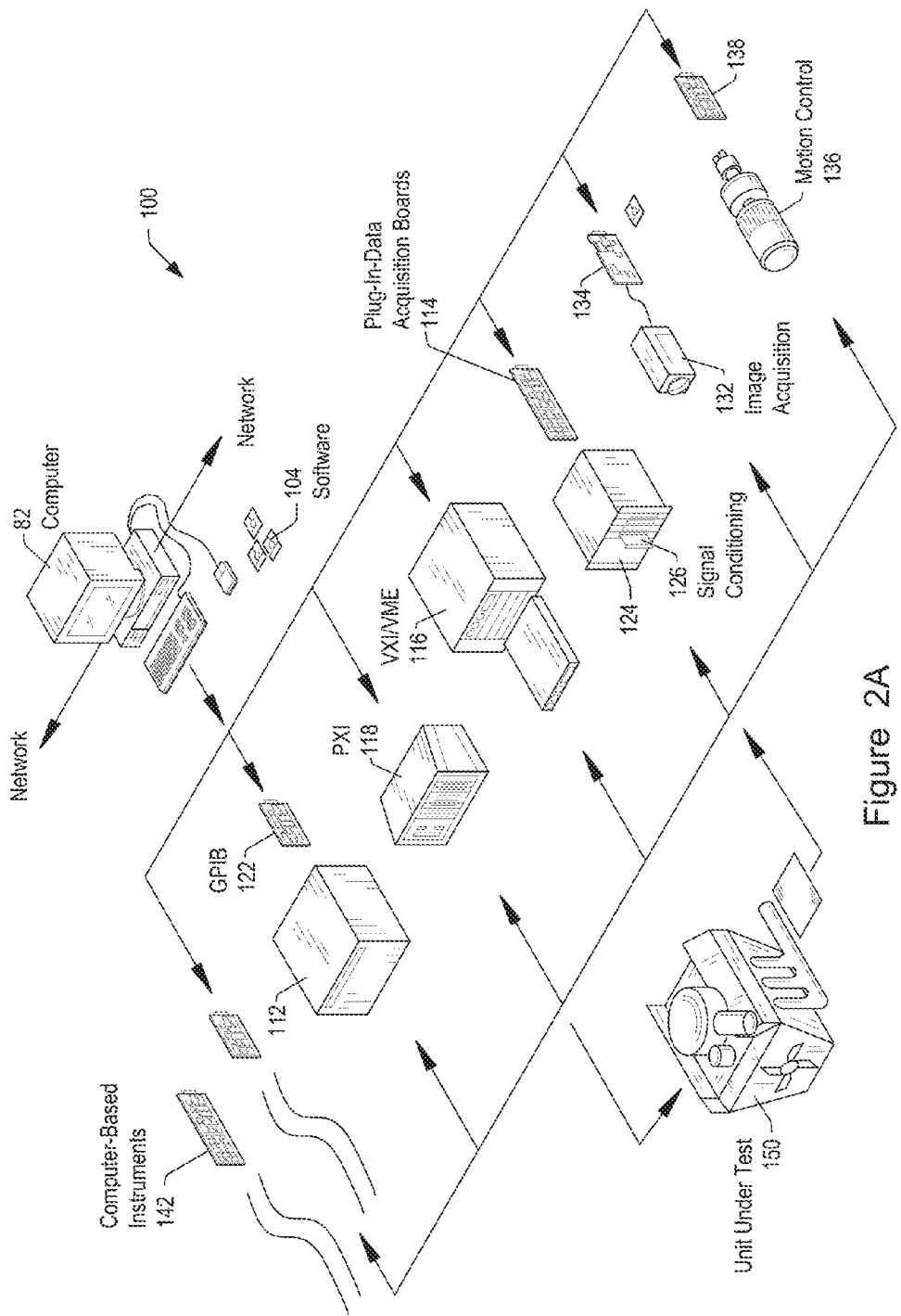
FIG. 2A illustrates an instrumentation control system according to some embodiments.

FIG. 2A illustrates an exemplary instrumentation control system 100 which may implement embodiments described herein. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
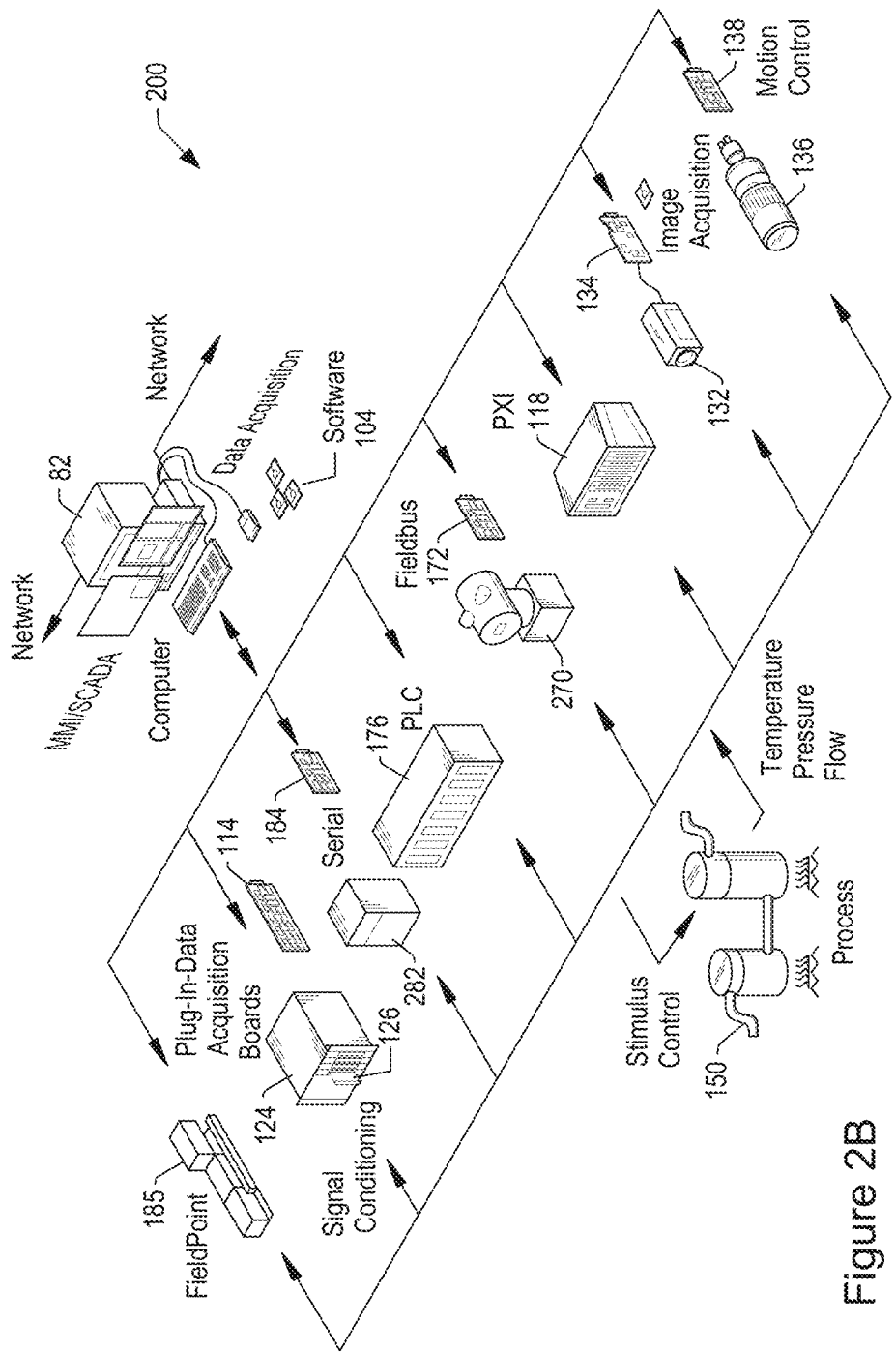
FIG. 2B illustrates an industrial automation system according to some embodiments.

FIG. 2B illustrates an exemplary industrial automation system 200 which may implement embodiments described herein. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
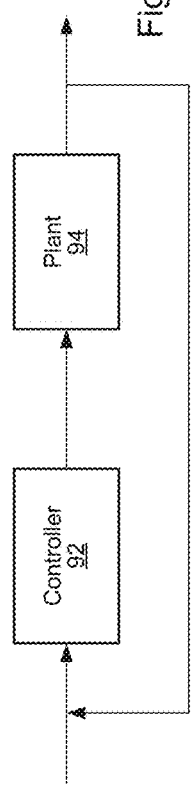
FIG. 3A is a high level block diagram of an exemplary system that may execute or utilize a signal alignment method as described herein.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program (e.g., a graphical program) that specifies or implements the functionality of one or both of the controller 92 and the plant 94. For example, a control engineer may use a modeling and simulation tool to create a model of the plant 94 and/or to create the algorithm for the controller 92.

Figure 3B:
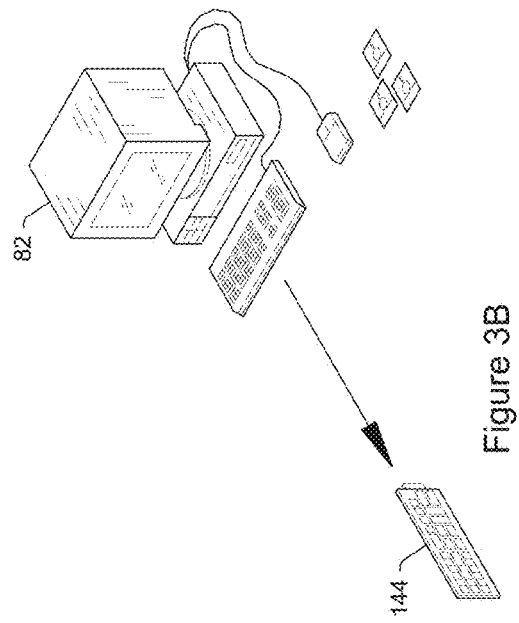
FIG. 3B illustrates an exemplary system that may perform control and/or simulation functions utilizing a signal alignment method as described herein.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program (e.g., a graphical program). In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration. Thus the user may create a program on a computer and use (execute) the program on that computer or deploy the program to a target device (for remote execution on the target device) that is remotely located from the computer and coupled to the computer through a network.

Software programs that perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
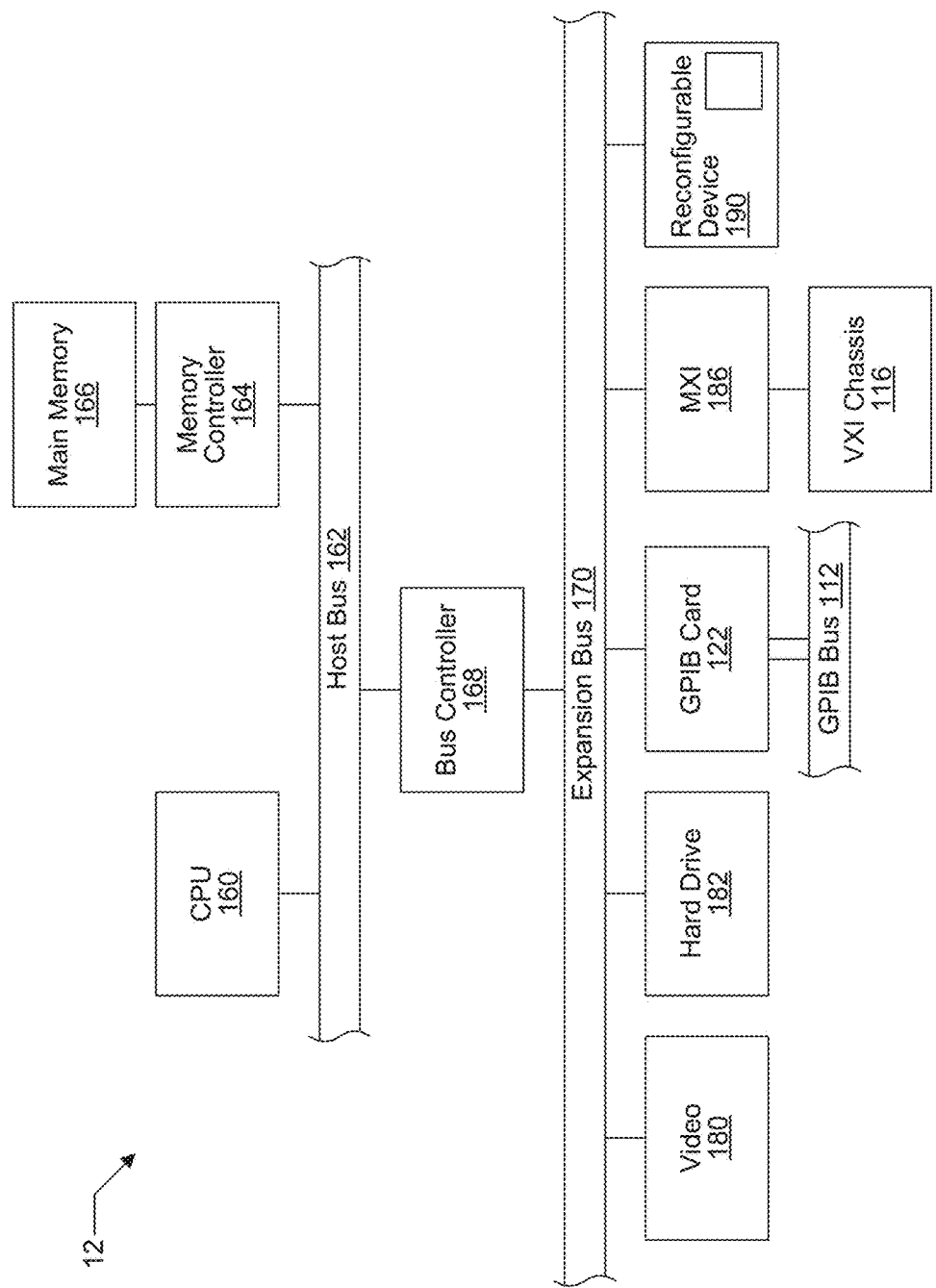
FIG. 4 is an exemplary block diagram of the computer systems of FIGS. 1A, 1B, 2A, 2B, and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a program (e.g., a graphical program) configured to implement embodiments of the present techniques. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program to the device 190 for execution of the program on the device 190. The deployed program may take the form of graphical program instructions or data structures that directly represents the graphical program. Alternatively, the deployed program may take the form of text code (e.g., C code) generated from the program. As another example, the deployed program may take the form of compiled code generated from either the program or from text code that in turn was generated from the program.

Figure 5:
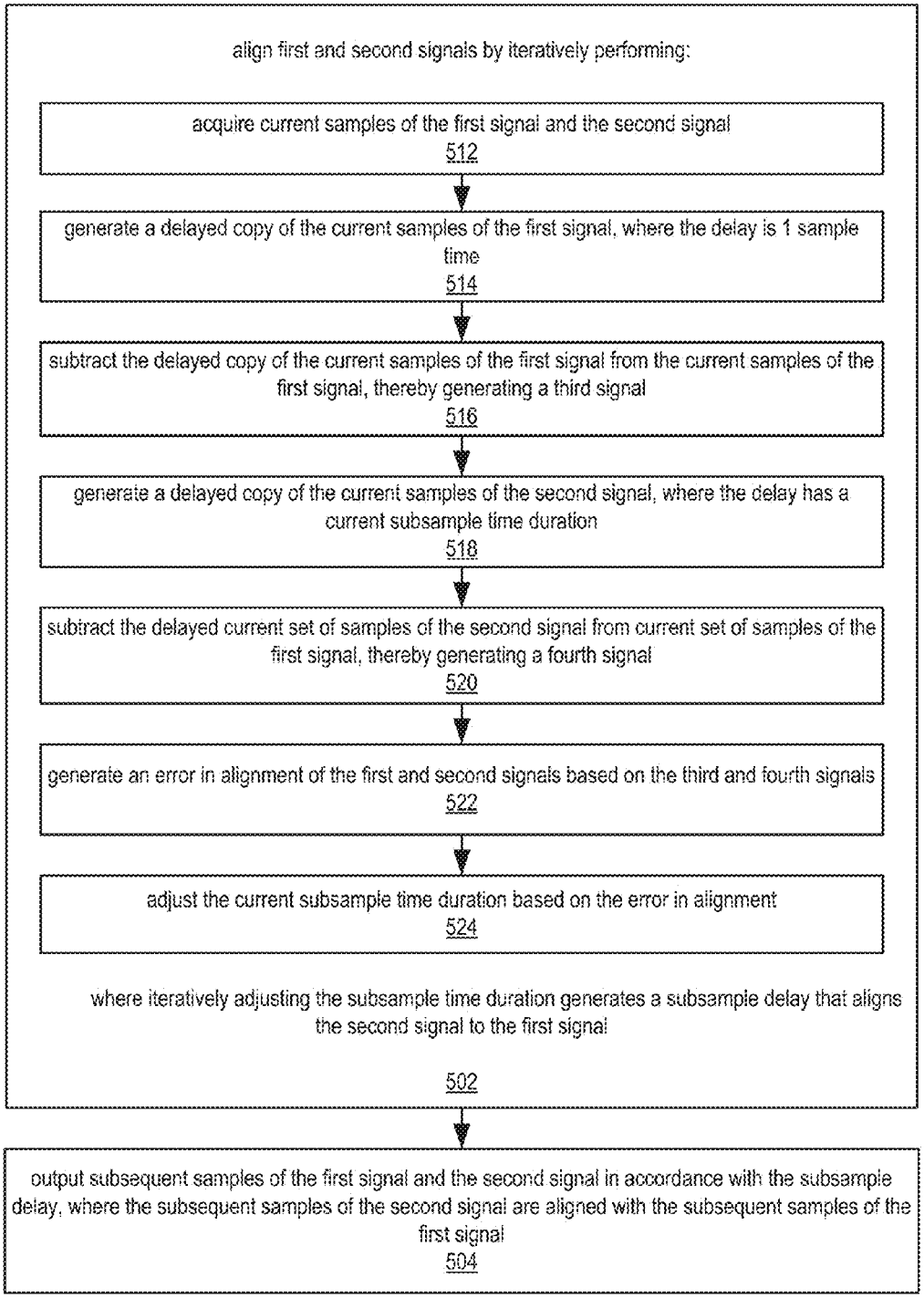
FIG. 5 is a flowchart diagram illustrating one embodiment of a method for real time subsample time resolution signal alignment in the time domain.

FIG. 5—Flowchart of a Method for Real Time Subsample Time Resolution Signal Alignment in the Time Domain FIG. 5 illustrates a method for performing real time subsample time resolution signal alignment in the time domain, according to some embodiments. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, first and second signals may be aligned by iteratively performing method elements 512-524.

As FIG. 5 shows, in 512, current samples of the first signal and the second signal may be acquired. The first and second signals may be a stimulus signal and a response signal, respectively. In some embodiments, a stimulus signal may be introduced to a black-box system and a response signal received from the black-box signal. In order to achieve accurate estimates of model parameters of the black-box system, the stimulus signal and the response signal may need to be aligned in the time domain. For example, a DAQ device (or multiple such devices) may acquire the current samples from one or more sensors of a measurement system. Note that "current samples" refers to one or more successive samples of the first signal, and a corresponding one or more successive samples of the second signal. Thus, the first and second signals may be or include respective data streams resulting from one or more sensors.

In 514, a delayed copy of the current samples of the first signal may be generated. In one embodiment, the delay is 1 sample time (i.e., 1 sample period). Note, however, that in other embodiments, the delay duration may have different values, e.g., 2 sample times, 3 sample times, or any other integer or non-integer value.

Figure 6:
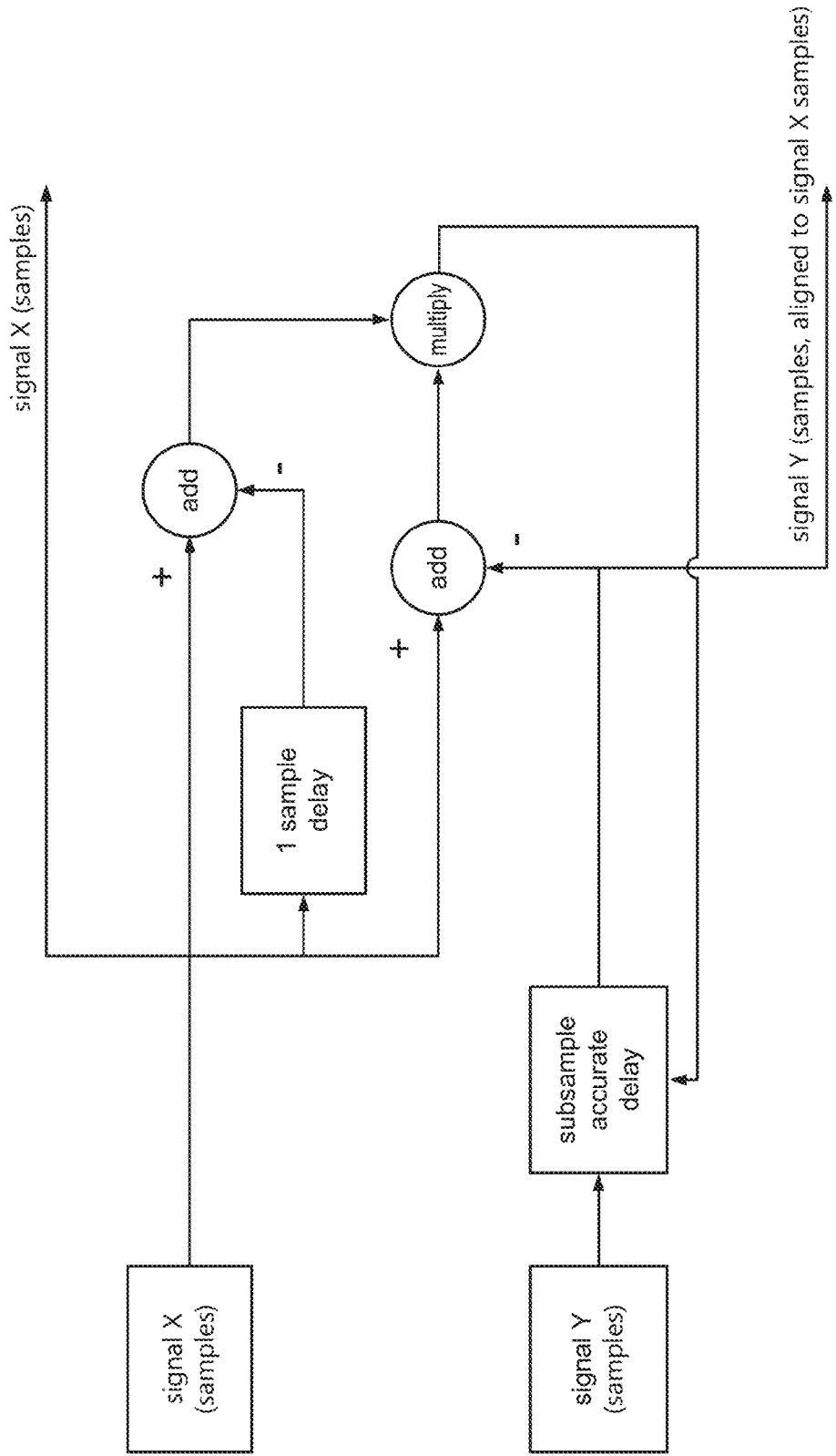
FIG. 6 is a high level block diagram of a system for real time subsample time resolution signal alignment in the time domain according to some embodiments.

FIG. 6 is a high level block diagram of an exemplary system configured to implement embodiments of the present techniques. As shown, the system is configured to receive acquired samples of a first signal (signal X) and acquired samples of a second signal (signal Y), as per method element 512 above. In accordance with 514, the system may be configured to generate the delayed copy of the samples of signal X (e.g., the first signal) and apply thereto a sample delay, such as a 1 sample delay.

In 516, the delayed copy of the current samples of the first signal may be subtracted from the current samples of the first signal, thereby generating a third signal. Thus, the third signal is or includes the difference between the current samples (of the first signal) and a delayed copy of the current samples (of the first signal). Referred again to FIG. 6, this subtraction may be implemented via an add element (see top "add" element of FIG. 6) which adds the current samples of signal X to negatives of the delayed copy, as indicated by the negative sign at the bottom input of the add element.

In 518, a delayed copy of the current samples of the second signal may be generated. The delay in this case may be or have a current subsample resolution time duration. In other words, the delay applied to the copy of the current samples of the second signal may be less than the sample period. FIG. 6 illustrates the performance of this method element by the block labeled "subsample accurate delay," which may be implemented in any of a variety of ways, e.g., via a delay filter configured to generate and apply subsample resolution delay values to samples of signal Y.

In 520, the delayed copy of the current samples of the second signal may be subtracted from the current samples of the first signal, thereby generating a fourth signal. Thus, similar to 516, the fourth signal is or includes the difference between the current samples of the first signal and a delayed copy of the current samples of the second signal. FIG. 6 implements this subtraction via a second "add" element (see bottom "add" block"), which adds the current samples of signal X to negatives of the delayed copy of the current samples of signal Y, as indicated by the negative sign at the bottom input of the second add element.

In 522, an error in alignment of the first and second signals may be generated (or computed) based on the third and fourth signals. In the exemplary system of FIG. 6, the error in alignment is generated by multiplying the third signal and the fourth signal together by a "multiply" element, so labeled.

In 524, the current subsample resolution time duration (of the subsample resolution delay) may be adjusted based on the error in alignment. This adjustment is indicated in the system of FIG. 6 by the line from the multiply element to the "subsample accurate delay" block, where the subsample resolution delay is modified based on the product output by the multiply element.

In other words, based on the generated error of 522, the current subsample resolution time duration (and thus, the delay applied to the samples of the second signal) may be modified to decrease the error in alignment. As noted above in 502, the method elements 512-524 may be performed iteratively, i.e., may be repeated one or more times. For example, the current subsample resolution time duration may be adjusted until a termination condition is met. The particular termination condition used may be application dependent, and may be or include any conditions desired. For example, the termination condition may be or include the error (of 522) being less than some specified threshold. Accordingly, in some embodiments, once a termination condition is met or satisfied, the method may leave the value of the current subsample resolution time duration (and thus, the subsample delay applied to the samples of the second signal) unchanged. Iteratively adjusting the subsample resolution time duration may generate a subsample resolution delay that aligns the second signal to the first signal.

Finally, in 504, subsequent samples of the first signal and the second signal may be output in accordance with the subsample resolution delay, where the subsequent samples of the second signal are aligned with the subsequent samples of the first signal. In other words, once an acceptable level of error (in alignment of the current samples of the first and second signals) is achieved, the most recent value of the current subsample resolution time duration may be used as the subsample resolution delay for subsequent samples of the second signal, thereby aligning the subsequent samples of the second signal with those of the first signal. This output is represented in the system of FIG. 6 by the arrows respectively labeled "signal X (samples)" and "signal Y (samples, aligned to signal X samples). Note that in various embodiments, the system of FIG. 6 may be implemented in any of a variety of ways. For example, any device with a functional unit may be used to implement the techniques disclosed herein.

Note that in some embodiments, the acquired samples of the first and second signals are respective (acquired) data streams, and that once the subsample resolution delay is determined (iteratively, per the above), the delay is applied to (further samples of) the second data stream (i.e., the subsequently acquired samples of the second signal), thereby aligning them with those of the first data stream (the subsequently acquired samples of the first signal). Said another way, after the determination of the subsample resolution delay, the subsample resolution delay may be applied to the (continuing) second data stream, thereby aligning the respective (acquired) data streams of the first and second signals, which may be output accordingly.

Embodiments of the techniques disclosed herein operate to perform alignment of signals, e.g., low bandwidth signals, in the time domain, and in real time. The ability to perform time alignment in the time domain may improve the accuracy of time delay estimates, and significantly reduce the complexity of the technique. The low complexity nature of the technique may allow for a real time implementation on programmable hardware, e.g., a field programmable gate array (FPGA). Furthermore, since the present technique may use only a fraction of the available resources on the programmable hardware, other portions of the programmable hardware, e.g., FPGA slices, may be available for additional signal processing. Moreover, some embodiments of the present techniques may facilitate development of a real-time digital predistortion estimator and applicator on a Field Programmable Gate Array (FPGA) assisted instrument, where, due to the low complexity of the method, many FPGA slices may be available for end user customization.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system, comprising:
   an input;
   a functional unit, coupled to the input; and
   an output, coupled to the functional unit;
   wherein the functional unit is configured to:
   a) acquire, via the input, a current set of samples of a first signal and a second signal;
   b) generate a delayed copy of the current set of samples of the first signal using a first delay;
   c) subtract the delayed copy of the current set of samples of the first signal from the current set of samples of the first signal, thereby generating a third signal;
   d) generate a delayed copy of the current set of samples of the second signal using a second delay, wherein the second delay has a current subsample resolution time duration;
   e) subtract the delayed copy of the current set of samples of the second signal from the current set of samples of the first signal, thereby generating a fourth signal;
   f) generate an error in alignment of the first and second signals based on a product of the third and fourth signals; and
   g) adjust the current subsample resolution time duration based on the error in alignment;
   perform a)-g) one or more times in an iterative manner, wherein iteratively adjusting the current subsample resolution time duration generates a subsample resolution delay that aligns the second signal to the first signal; and
   output, via the output, subsequent sets of samples of the first signal and the second signal in accordance with the subsample resolution delay, wherein the subsequent sets of samples of the second signal are aligned with the subsequent sets of samples of the first signal.

2. The system of claim 1, wherein the performing a)-g) one or more times in an iterative manner is performed until a termination condition is met.

3. The system of claim 2, wherein the termination condition is application dependent.

4. The system of claim 2, wherein the termination condition is the error in alignment being less than a specified threshold.

5. The system of claim 2, wherein, responsive to the termination condition being met, the functional unit is further configured to maintain the current subsample resolution time duration.

6. The system of claim 1, wherein the first signal is a stimulus signal and the second signal is a response signal.

7. The system of claim 1, wherein the first delay is one sample period, and wherein the second delay is less than one sample period.

8. The system of claim 1, wherein the subsample resolution time duration is implemented via a delay filter.

9. The system of claim 1, wherein the first signal and the second signal are respective data streams from one or more sensors.

10. The system of claim 1, wherein the functional unit is a field programmable gate array (FPGA).

11. The system of claim 10, wherein the FPGA is further configured to perform additional signal processing.

12. The system of claim 1, wherein the configuration of the functional unit is performed via a graphical program.

13. A non-transitory computer accessible memory medium that stores program instructions executable to implement:
   aligning a stimulus signal and a response signal by iteratively performing:
      acquiring current samples of the stimulus signal and the response signal;
      subtracting a delayed copy of the current samples of the stimulus signal from the current samples of the stimulus signal, thereby generating a first signal;
      subtracting a delayed copy of the current samples of the response signal from the current samples of the stimulus signal, thereby generating a second signal, wherein the delayed copy of the current samples of the response signal is delayed by a current subsample resolution time duration;
      generating an error in alignment of the stimulus and response signals based on a product of the first and second signals; and
      adjusting the current subsample resolution time duration based on the error in alignment;
   wherein iteratively adjusting the subsample resolution time duration generates a subsample resolution delay that aligns the response signal to the stimulus signal; and
   outputting subsequent samples of the stimulus signal and the response signal in accordance with the subsample resolution delay, wherein the subsequent samples of the response signal are aligned with the subsequent samples of the stimulus signal.

14. The non-transitory computer accessible memory medium of claim 13, wherein the iteratively adjusting the subsample resolution time duration is performed until a termination condition is met.

15. The non-transitory computer accessible memory medium of claim 14, wherein the termination condition is application dependent.

16. The non-transitory computer accessible memory medium of claim 14, wherein the termination condition is the error in alignment being less than a specified threshold.

17. A method, comprising:
performing, by a functional unit:
aligning a stimulus signal and a response signal by iteratively performing, until a termination condition is reached:
acquiring the stimulus signal and the response signal;
calculating a first signal, wherein the first signal is the stimulus signal minus a delayed copy of the stimulus signal;
calculating a second signal, wherein the second signal is the stimulus signal minus a delayed copy of the response signal, wherein the delayed copy of the response signal is delayed by a current iteration of a subsample resolution time;
calculating an error, wherein the error is a product of the first signal and the second signal; and
adjusting the current iteration of the subsample resolution time based on the calculated error; and
responsive to reaching the termination condition, maintaining the current iteration of the subsample resolution time and outputting the stimulus signal and the response signal in accordance with the current iteration of the subsample resolution time.

18. The method of claim 17, wherein the termination condition is application dependent.

19. The method of claim 17, wherein the termination condition is the error being less than a specified threshold.

\* \* \* \* \*